United States Patent Office 3,356,466
Patented Dec. 5, 1967

3,356,466
METAL-TO-GLASS-TO-CERAMIC SEAL
Nicolaas Wildeboer and David T. Landsittel, Murray Hill, N.J., assignors to Philips Electronics and Pharmaceutical Industries Corp., New York, N.Y., a corporation of Maryland
Filed July 28, 1965, Ser. No. 475,538
9 Claims. (Cl. 29—191)

This invention relates to a hermetic seal comprising inner and outer metal members with glass and ceramic insulation spanning the gap between them and to the method of making such seals.

There has been a long-recognized need to improve the ability of hermetic seals to withstand high temperatures, high voltages, and high mechanical forces. Compression glass-to-metal seals have proved to be mechanically the strongest, and strain-free seals have been better adapted for use with very high voltages, but in both cases new uses are constantly arising to challenge the best that can be done with existing technology. One of the limitations of glass-to-metal hermetic seals is that cracks in the glass tend to propagate relatively rapidly entirely across the glass. Even where such cracks are only on the surface, they tend to collect dirt, which makes them more likely to be conductive and therefore, when the cracks run from the inner metal member to the outer one, they may render the seal useless insofar as its insulating properties are concerned although it may still be hermetically tight. In other cases the cracks may propagate through the glass so that the seal is no longer hermetically tight but may stop short of forming a conductive path from the inner metal member to the outer one. In that case the insulating properties of the seal would still be present, but it would no longer be hermetic.

Certain ceramics have excellent strength and electrical resistance properties, but these materials do not lend themselves to known methods of sealing to metal in the same way that glass does. In particular the process by which compression glass-to-metal seals are formed does not lend itself to production of seals in which ceramic replaces the metal. For one thing, it is thought that the crystalline particles in the ceramic tend to form stress centers which would make it impossible to produce compression in the ceramic of the type that can be produced in pure glass. This is one of the things that has prevented the use of ceramic as the sole insulating medium in true hermetic seals having compression characteristics.

In accordance with the present invention it has been found possible to utilize the qualities of strength and insulation possessed by certain ceramic materials in conjunction with the ease of formation afforded by glass. In general seals according to the present invention are formed by placing inner and outer metal members in proper relationship to each other and to a ceramic member in the form of a hollow tube that surrounds an inner metal member and lies between it and the outer metal member but does not completely fill the gap between the two. Glass is used to fill the gap and in most instances the glass is separated into two parts, one part filling the annular gap between the inner metal member and the ceramic and the other filling the annular gap between the ceramic and the outer metal member. The glass, ceramic member, and metal members are placed in a suitable jig and heated until the glass is sufficiently hot to seal to the adjoining members so as to form, with the ceramic, an insulating bridge that fills the entire annular gap between the inner and outer metal members. If desired the length of the ceramic member in a direction perpendicular to the plane of the aperture of the outer metal member may be greater than the thickness of the outer metal member, thus providing a longer path separating the proximate points of the inner and outer members so as to increase the minimum voltage at which an electrical discharge can take place between the inner and outer members. The ceramic member may extend beyond the planes of both surfaces of the outer metal member or may extend beyond the plane of only one of them and the entire longitudinal space between the inner metal member and the ceramic may be filled with glass or there may be only a relatively thin piece of glass filling the space between the inner metal member and the inner surface of the ceramic so that the ceramic extends outwardly from the surface of both the inner and outer glass members. The insulation gap may be further extended in such a case by inserting an insulating sleeve around the inner metal member to cause voltage breakdown to occur only over a relatively long tortuous path going from the outer metal member to the end of the ceramic member thence downwardly along the inner surface of the ceramic member and across the surface of the inner glass to the inner member. The voltage required to cause breakdown of such an extended path can relatively easily be extended to 10,000 volts or more.

The invention will be further described in connection with the drawings in which.

Figure 1:
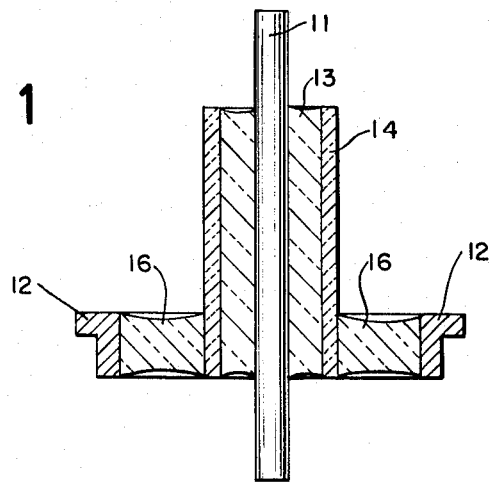
FIG. 1 shows one embodiment of the hermetic seal constructed in accordance to the invention.

FIG. 1 shows a simple seal having a cylindrical inner metal member 11, an outer metal member 12 in the form of a hollow, closed ring, and insulating member bridging the annular gap between the two and comprising an inner glass member 13a, hollow ceramic tube 14 and an outer glass member 16.

The materials used in constructing the seal in FIG. 1 depend upon whether the seal is intended as a compression seal or as a so-called strain-free seal. In the case of the strain-free seal, the inner metal member 11 would be of the same type of metal as the outer metal member 12 and all three of the insulating components would have coefficients of thermal expansion substantially matching those of the two metal members over a range of temperatures from approximately room temperature to approximately the annealing temperature of the glass members 13 and 16. Typical components for this type of strain-free seal would be Rodar or Kovar or similar metals for the inner metal member 11 and the outer metal member 12 and borosilicate glass, such as Corning #7052, for both of the glass members 13 and 16. The ceramic member, which is in the form of a hollow ceramic rod, could be made of steatite which is $MgO \cdot SiO_2$, or spinel which is $MgO \cdot Al_2O_3$ or alumina of approximately 93% purity. Still another material that could be used is mullite. Of the various ceramic materials, steatite is the cheapest and alumina is the strongest. Where strength is the most important factor alumina would be used although spinel is the second strongest and might also be considered. Where price is the primary consideration steatite would probably be used in matched seals.

If the seals were to be of the compression type, the inner metal member might be of a type known as #52 alloy which consists of approximately 51% nickel and the balance iron while the outer metal member 12 could be one of a number of materials, one of the cheapest and best of which is cold rolled steel. In the case of compression seals the outer metal member 12 would have to have sufficient strength to withstand the forces built up in it, hence the rather substantial cross section of the outer metal member 12. In the case of strain-free seals no such forces would be built up and therefore the cross sectional thickness of the outer metal member 12 could be much thinner than is indicated in FIG. 1. In compression seals the two glass members 13 and 16 may be of the same type of glass such as Corning 9010, for example, and the ceramic member 14 could be chosen accordingly. Forsterite is a very suitable ceramic material for use in compression seals and consists of $2MgO \cdot SiO_2$.

Heretofore in making compression seals with any substantial part of the glass extending beyond the plane of the rim of the outer metal member, the forces in the glass have tended to make the glass subject to breakage. However, by using the ceramic member 14, the glass member 13 may be kept from fracturing and thus the surface leakage path from the nearest point at the inner top part of the rim of the outer metal member 12 to the closest point of the inner metal member 11 contiguous with the top part of the inner glass member 13 is greatly increased, which means that the seal can be used with a much higher voltage between the members 11 and 12 than has heretofore been possible in the case of compression seals. Similarly the breakdown path through air is also increased although, instead of following exactly the contours of the insulating members, the air path would go diagonally from the inner edge of the rim of the outer metal member 12 to the upper corner of the ceramic member 14 and thence directly across to the nearest part of the inner metal member 11. While this is slightly shorter than the surface path of conduction, it is still greatly increased by virtue of the extension of the ceramic member 14 and the inner glass member 13 beyond the upper surface of the outer glass member 16.

Figure 2:
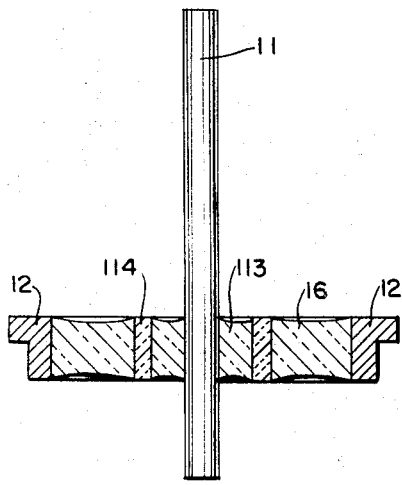
FIG. 2 shows a modification of the seal of FIG. 1.

FIG. 2 shows a seal similar to that of FIG. 1 except that the axial length of the ceramic member 114 and the inner glass member 113 is approximately the same as the axial length of the outer glass member 16 and the outer metal member 12. This type of seal has substantially the same voltage breakdown characteristics at room temperature as would a glass seal of the same configuration. However,, because of the strength of the ceramic member 114, cracks propagated across the glass member 113 or the glass member 16 would be stopped by the ceramic member and would not extend completely across from the outer metal member 12 to the inner metal member 11. Thus the ceramic ring 114 preserves the insulating qualities of the seal. Since the ceramic members mentioned hereinabove all have excellent insulating characteristics, the seal would retain excellent voltage breakdown characteristics with radial cracks in both glass members 13 and 16 as without.

An additional advantage of including the ceramic member 114 in the seal is that ceramic remains nonconductive at a higher temperature than glass. As the glass used in these seals is heated up to approximately 300° C. its volume resistivity drops, and therefore a seal in which the only insulator is glass becomes either completely useless at such temperatures or at least it does not have the same insulating quality as at lower temperatures. The ceramic 114, on the other hand, retains its insulating characteristics up to about 350° C.

Figure 3:
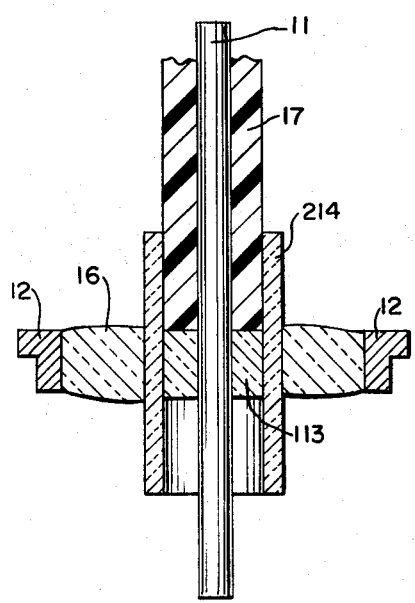
FIG. 3 shows a further modification of the seal of FIG. 1.

FIG. 3 shows another form of seal similar to those in FIGS. 1 and 2 except that in FIG. 3 the hollow ceramic tubular member 214 extends beyond the adjacent surface of the outer glass member 16 in both directions while the thickness of the inner glass member 113 remains the same as in the seal of FIG .2. The extra length of the ceramic member 214 increases both the surface leakage path length and the air breakdown path length and the air path may be further increased by slipping a sleeve 17 of a suitable material such as Teflon or the like over the inner metal member 11. When that is done, the air breakdown path extends from the inner ceramic member 214, thence down between the member 214 and the sleeve 17 and across the inner end of the sleeve 17 between it and the face of the inner glass member 113 to the inner metal member 11.

The seals described hereinabove may be made by placing the parts in suitable jigs which are usually made so there will be a number of assemblies for each jig plate, and running the jig plates through a furnace to heat the parts to the proper temperatures. It has been found that furnaces commonly used in producing both strain-free and compression seals are quite suitable for producing the present seals. In these furnaces it is common to have a preheat section running at a temperature of approximately 1300°–1500° F., followed by a sealing zone running at a temperature of about 1800° ±100° F. The jigs with the parts thereon are held in the sealing zone long enough to allow the glass to reduce its viscosity to the point where it will fuse to the adjacent metal and ceramic members.

The atmosphere in the sealing zone of the furnace may be approximately neutral or it may be oxidizing or reducing. In the case of compression seals, there should be sufficient oxide on the surface of the metal members to allow the glass to wet them. In the case of strain-free seals, the oxide layer on the metal members should be sufficiently heavy to make possible the necessary joining of the glass and metal parts through the dissolution of the oxide layer in the manner well-known in making strain-free seals. After the metal and glass parts have fused together and fused to the ceramic member, the jig may be moved into a cooling zone to permit the jig and the seals thereon to cool down to a temperature below the strain point of the glass, preferably considerably below that point so that the seals can be removed from the jig and treated as solid members.

While this invention has been described in terms of specific components, it will be understood by those skilled in the art that modifications may be made therein without departing from the true scope of the invention as described by the following claims.

What is claimed is:

1. A seal comprising: An outer metal member having an aperture therein; an inner metal member within said aperture and spaced therefrom; a hollow ceramic member completely encircling said inner member between said inner and outer members and spaced from both said inner and outer members; and glass encircling and fused to said inner member completely to form an unbroken bridge from said inner member to said ceramic member and fused to said ceramic member and encircling and fused to said ceramic member to form an unbroken bridge from said ceramic member to said outer metal member and fused to said outer metal member.

2. A seal comprising: An outer metal member having an inner rim defining an aperture therein sufficiently smaller than the outer periphery of said metal member so that the metal between said rim and said periphery has substantial radial strength; an inner metal member having a lower coefficient of expansion than said outer metal member and being located within said aperture and spaced from said outer metal member; a hollow ceramic member completely encircling said inner member between said inner member and said outer member and spaced from both said inner and outer members, said ceramic member having a coefficient of thermal expansion substantially lower than said outer metal member; and glass fused to said inner member, said ceramic member, and said rim to form, with said ceramic member, an unbroken insulating bridge from said inner member to said outer member, said glass having a coefficient of thermal expansion substantially lower than that of said outer metal member, said coefficients of expansion being defined in the temperature range from about room temperature to about the strain point of said glass.

3. A seal comprising: An outer metal member having an inner rim defining an aperture therethrough; an inner metal member within said aperture and spaced from said outer member; a hollow ceramic member completely encircling said inner member between said inner and outer members and spaced from both said inner and outer members; and glass encircling and fused to said inner member, said ceramic member, and said rim to form, with said ceramic member, an unbroken insulating bridge from said inner member to said outer member, said inner member, said outer member, said glass, and said ceramic all having substantially equal coefficients of thermal expansion over the range of temperatures from about room temperature to about the annealing region of said glass.

4. The seal of claim 3 in which said glass is a borosilicate glass and said inner and outer members have coefficients of thermal expansion substantially matching the coefficient of thermal expansion of said glass over a range of temperatures from about room temperature to about the annealing point of said glass, and said ceramic is selected from a group comprising steatite, spinel, mullite, and alumina.

5. The seal of claim 4 in which said ceramic is alumina of about 93% purity.

6. The seal of claim 4 in which said ceramic is mullite.

7. The seal of claim 4 in which said ceramic is spinel.

8. The seal of claim 4 in which said ceramic is steatite.

9. A seal comprising: An outer metal member having an inner rim defining an aperture therethrough; an inner metal member within said aperture and spaced from said outer metal member; a hollow ceramic member completely encircling said inner member between said inner and outer members and spaced from both said inner and outer members, the length of said ceramic in a direction perpendicular to the plane of said aperture being at least substantially as great as the portion of said outer metal member defining said rim; a first glass member encircling and fused to said inner member and fused to the inner surface of said ceramic member to form a first unbroken insulating bridge from said inner member to said ceramic member; and a second glass member encircling and fused to the outer surface of said ceramic member and fused to said rim of said outer member to form a second unbroken insulating bridge from said ceramic member to said outer metal member.

References Cited
UNITED STATES PATENTS

| | | | |
|---|---|---|---|
| 2,677,877 | 5/1954 | Cox | 29—195 |
| 2,780,561 | 2/1957 | Forge | 29—195 |
| 3,219,753 | 11/1965 | Vassos | 29—195 |
| 3,226,822 | 1/1966 | Budde et al. | 29—195 |

DAVID L. RECK, *Primary Examiner.*

RICHARD O. DEAN, *Examiner.*